July 19, 1966  O. A. KERSHNER ETAL  3,261,431
ELECTROMAGNETIC FRICTION UNIT
Filed June 4, 1964  3 Sheets-Sheet 1

Inventors'
Osborn A. Kershner
Emil H. Hahn
By Olson, Trexler, Wolters & Bushnell Attys.

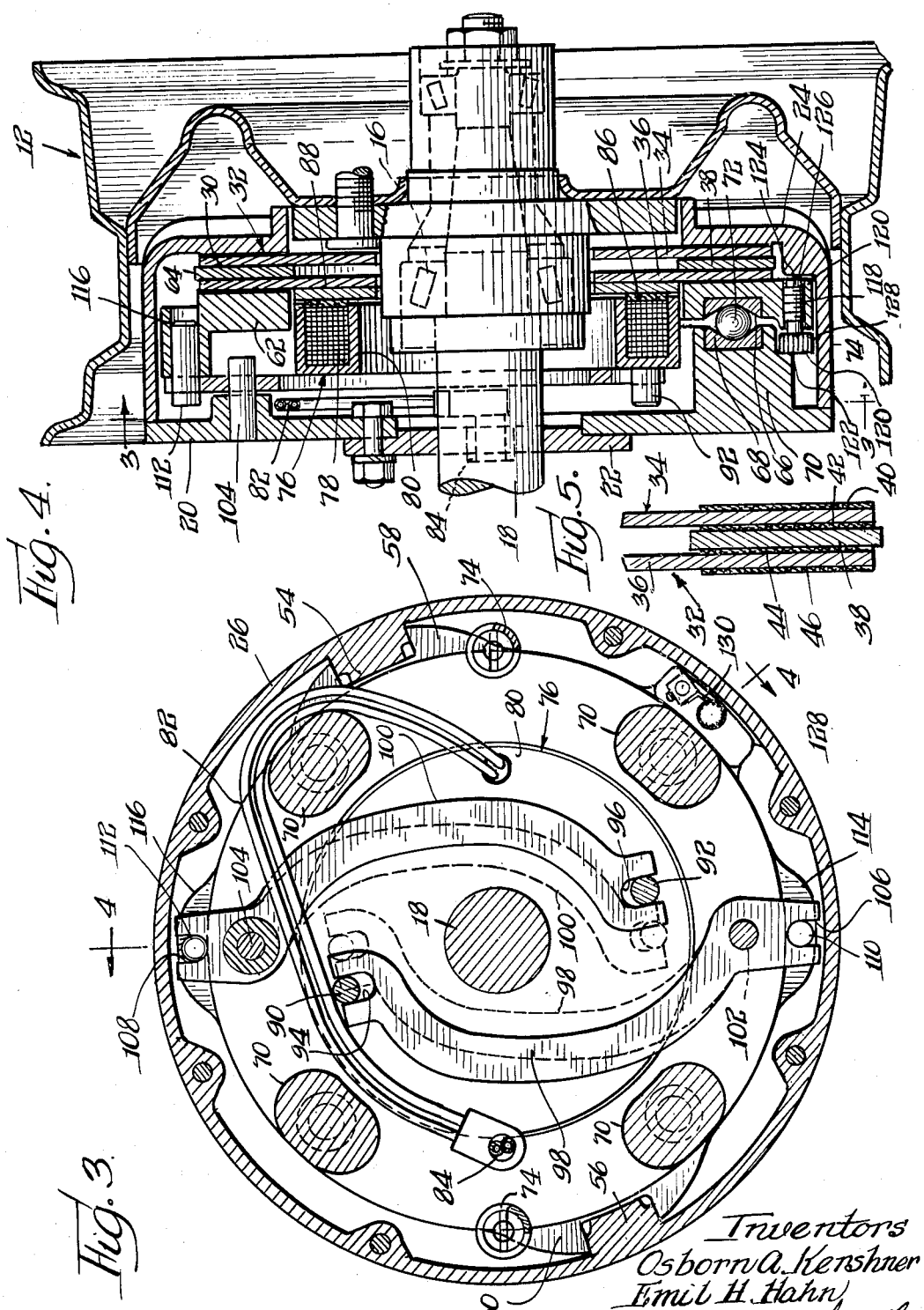

July 19, 1966  O. A. KERSHNER ETAL  3,261,431
ELECTROMAGNETIC FRICTION UNIT
Filed June 4, 1964  3 Sheets-Sheet 3

Inventors
Osborn A. Kershner
Emil H. Hahn
By: Olson, Trexler, Wolters & Bushnell attys

United States Patent Office 3,261,431
Patented July 19, 1966

3,261,431
ELECTROMAGNETIC FRICTION UNIT
Osborn A. Kershner and Emil H. Hahn, both of St. Joseph, Mich., assignors, by mesne assignments, to Lambert Brake Corporation, St. Joseph, Berrien, Mich., a corporation of Michigan
Filed June 4, 1964, Ser. No. 372,543
11 Claims. (Cl. 188—138)

The present invention relates to novel friction devices, more specifically to novel brake or clutch structures.

While certain features of the present invention are adaptable for use in friction clutch or drive units, the present disclosure will be facilitated by showing and describing embodiments especially adapted for use as brakes for controlling vehicle wheels, rotatable parts in machines and the like.

An important object of the present invention is to provide a novel friction device or brake unit which is electromagnetically operable and is relatively efficient in operation.

A more specific object of the present invention is to provide a novel friction device which is electromagnetically operable and is also self-energizing.

Still another important object of the present invention is to provide a novel disc type friction device or brake unit which is electrically operable and adapted to provide a relatively aggressive and effective frictional engagement between parts or braking action for a given amount of electrical energy input.

Still another object of the present invention is to provide a novel friction device or brake unit of the above-described type which is of relatively simple, compact and rugged construction.

Other objects and advantages of the present invention will become apparent from the following description and the accompanying drawings wherein:

FIG. 3 is a sectional view taken along line 3—3 in FIG. 4;

FIG. 4 is a sectional view taken generally along line 4—4 in FIG. 3;

FIG. 5 is a fragmentary view showing friction rotor and stator elements of the structure in greater detail;

Figure 1:
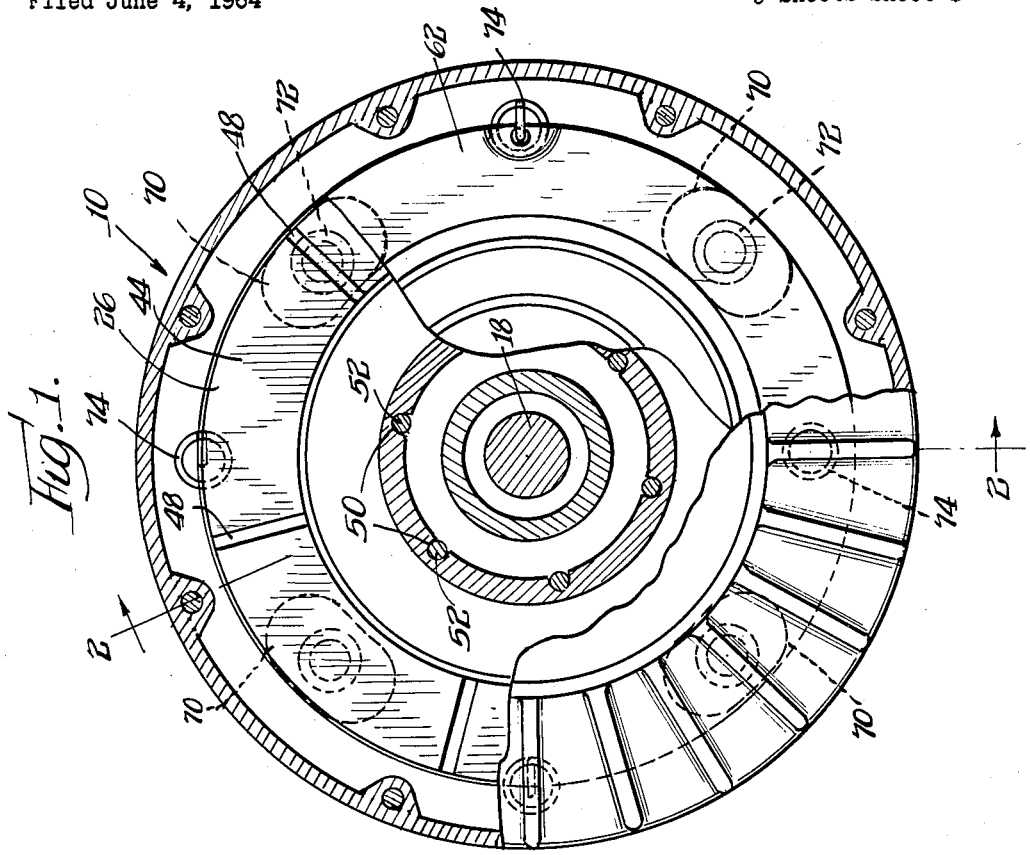
FIG. 1 is a sectional view taken generally along line 1—1 in FIG. 2 showing a friction device incorporating features of the present invention, and further broken away in order to show details of construction.

Referring now more specifically to the drawings wherein like parts are designated by the same numerals throughout the various figures, a friction device or brake unit 10 is shown in FIGS. 1 through 5 and comprises an embodiment which is especially adapted for use as a brake in association with a vehicle wheel 12. The wheel 12 is of known construction and is adapted to be mounted on a hub member 14 which in turn is rotatably supported by bearing means 16 on a fixed axle 18.

Figure 2:
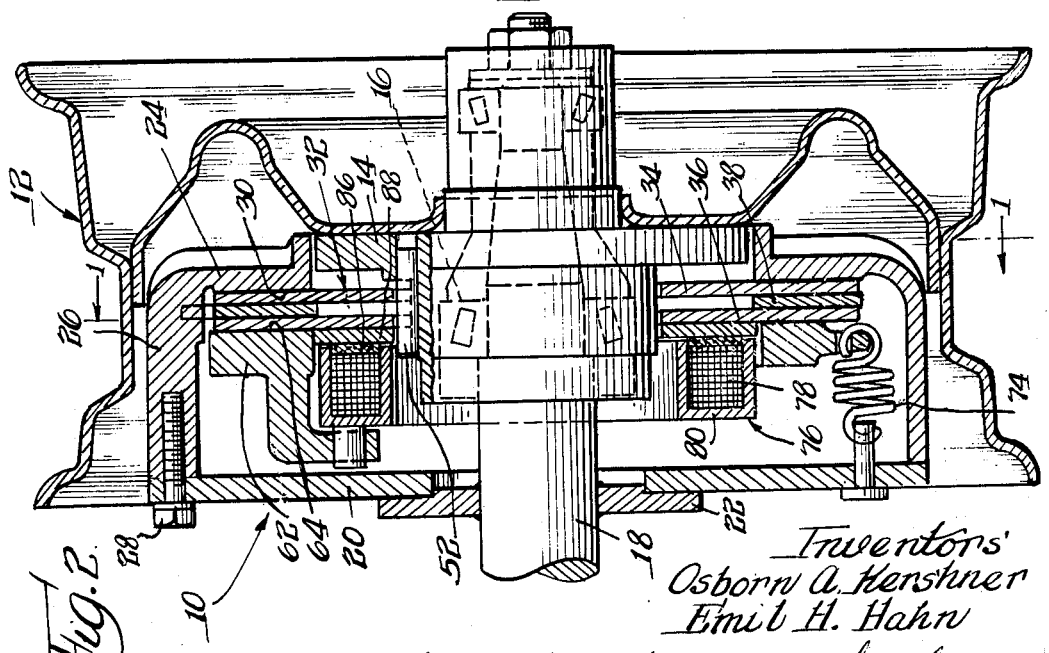
FIG. 2 is a partial sectional view taken generally along line 2—2 in FIG. 1.

The brake unit 10 comprises a first housing end member 20 detachably secured to a flange 22 welded or otherwise fixed to the axle 18 as shown in FIGS. 2 and 4. The housing means of the brake unit includes an opposite annular end member 24 integrally or otherwise connected with a peripheral axially extending flange 26 which abuts and is secured to the end member 20. Screws 28 or other suitable fastening means may be provided for securing the housing peripheral portion 26 to the end member 20.

The housing end member 24 presents an annular friction surface 30 surrounding the wheel hub 14 and cooperable with friction disc means 32 and the brake is energized as described hereinbelow.

In the embodiment shown, the friction disc means 32 comprises a plurality of discs 34 and 36 as shown in FIGS. 2, 4 and 5 which is connected for rotation with the wheel hub 14. In addition a stator disc 38 is disposed between the rotor discs 34 and 36. The rotor discs are made from a suitable magnetic material such as steel and preferably have annular bands 40–42 and 44–46 of friction material bounded or otherwise secured to opposite sides thereof as shown best in FIG. 5. The stator disc 38 is formed from a suitable metal and presents friction surfaces respectively cooperable with the bands 42 and 44 of friction material on the rotor discs. It will be appreciated that various friction materials may be used for the bands 40 through 46 and, if desired, the bands of friction material may be divided into segments by grooves 48 as shown in FIG. 1 so as to promote the circulation of air or other cooling fluid through the brake unit.

The inner margins of the rotor discs 34, 36 are formed with a plurality of spaced notches 50. These notches are adapted to accommodate pins 52 connected with the wheel hub member 14 as shown in FIGS. 1 and 2 so that the rotor discs are connected for rotation with the wheel hub while being adapted to shift axially of the wheel hub during operation of the brake structure.

The stator disc 38 is supported between the rotor discs by a plurality of bosses 54 and 56 formed on and projecting inwardly from the peripheral housing wall or flange 26. The bosses present arcuate inwardly facing surfaces engageable with a peripheral edge of the stator disc for supporting the disc substantially concentric to the wheel. The stator disc has lugs 58 and 60 projecting therefrom for engagement with the bosses and limiting rotation of the stator disc as shown in FIG. 3.

The brake unit 10 includes a primary actuating disc 62 adapted to be axially shifted in the manner described below during a braking operation for engaging a friction surface 64 thereof against the adjacent rotor disc and clamping the rotor and stator discs between the friction surfaces 30 and 64 for controlling the rotation of the wheel hub 14. The actuator disc 62 is provided with a plurality of spaced cam surfaces or conical ball seats 66 in a side thereof opposite from the fraction surfaces 64. The ball seats 66 respectively oppose surfaces or conical ball seats 68 on bosses 70 spaced around and projecting axially inwardly from the housing end member 20. In the embodiment shown, the cam or ball seats 66 and 68 are provided by inserts, but it is to be understood that these seats may be formed integrally with the actuator disc 62 and the bosses 70 respectively, if desired. Ball bearing elements 72 are respectively disposed between opposing pairs of seats 66 and 68.

Tension springs 74 are connected between the actuator disc 62 and the housing end wall 20 as shown in FIGS. 1 and 2. These springs which are preferably uniformly spaced around the brake unit normally yieldably bias the actuator disc 62 to a retracted position toward the end wall 20 so that the ball elements 72 are urged toward the bottom of the conical cam surfaces or ball seats 66 and 68. As a result the actuating disc 62 is supported by the ball elements and the springs and the coperable cam seats substantially concentrically with the wheel member.

In order to energize the brake structure, means is provided for rotatably biasing the actuating discs 62 relative to the fixed housing end wall 20. When the actuating disc 62 is rotated slightly relative to the end wall 20, the ball elements 72 tend to ride up on higher portions of the cam surfaces 66 and 68 and thereby force the actuating disc 62 away from the end wall 20 and against the adjacent rotor disc for clamping the rotor and stator discs against the friction surface 30. In accordance with a feature of the present invention means including electromagnetic means is provided for energizing the brake unit. More specifically, an annular electromagnet 76 is disposed within the housing means of the brake unit adjacent an inner margin of the rotor disc 36. The electromagnet comprises a coil 78 and an annular soft iron shell 80 having a generally U-shaped cross section as shown in FIG. 4. An electrical cable 82 has one end connected with the coil 78 and an opposite end connected with a terminal 84 extending through the housing end member 20 for connection with a suitable source of electrical energy as shown in FIGS. 3 and 4.

An annular pad or facing 86 of friction material is secured to the end of the coil adjacent the rotor disc. In the embodiment shown, an annular member 88 of magnetic material is detachably secured by screws or other suitable means to an inner marginal portion of the rotor disc 36. The member 88 provides a friction surface engageable with the friction element 86 of the electromagnet.

In order to actuate the brake structure, the electromagnet is energized. The magnet is supported for axial movement so that upon energization thereof, it is drawn toward the rotor disc 36, and in this embodiment, against the annular plate 88 secured to the rotor disc. More specifically, the friction pad 86 is magnetically forced against the annular plate 88 so that the electromagnet means is frictionally coupled to the rotor disc. The electromagnet is supported for limited rotative movement so that slippage will occur between the magnet and the rotor discs. However, a force is created for biasing or tending to rotate the electromagnet, which force has a magnitude in accordance with the frictional characteristics of the friction pad 86 and annular plate 88 and the force with which the pad 86 is magnetically urged against the plate 88. In this connection it is observed that the plate 88 not only serves as a replaceable wear plate but also serves to combine with the rotor disc 36 in providing a thickness at least as great as the wall thickness of the electromagnet shell 80 for insuring an efficient circuit for the magnetic lines of flux and thereby promoting aggressive engagement of the friction pad 86 against the pad 88 for a given amount of power input.

As shown in FIGS. 3 and 4 pins 90 and 92 extend axially from diametrically opposite portions of the magnet shell 80. These pins respectively project into slots 94 and 96 in ends of levers 98 and 100. The levers are respectively pivotally supported by pins 102 and 104 mounted in the housing end member 20. The levers have end portions projecting generally radially outwardly from the pivot pins 102 and 104, which end portions have slots 106 and 108 therein for accommodating pins 110 and 112. The pins 110 and 112 are respectively secured to and project axially from lugs 114 and 116 on diametrically opposite peripheral portions of the actuating disc 62.

When the brake is in a deenergized position the actuating disc is in the position shown in FIGS. 3 and 4 and the levers 98 and 100 are in the solid line positions shown in FIG. 3. Upon energization of the electromagnet, the friction pad 86 is urged against the plate 88 whereupon the rotating plate 88 frictionally drives or rotates the electromagnet so as to shift the pins 90 and 92 from the positions shown in solid lines in FIG. 3 toward the position shown in broken lines. This rotative movement of the electromagnet and the pins carired thereby causes the levers 98 and 100 to be pivoted from the solid line positions toward the broken line positions shown in FIG. 3 and the pivotal movement of the levers in turn causes the actuating disc 62 to be rotated and clamped against the adjacent rotor disc for initiating a braking action as described above. It is to be noted that the initial actuating force provided by the frictional engagement of the electromagnet friction pad against the rotor plate is increased significantly by the action of the levers 98 and 100 whereby to provide a more effective braking action for a given amount of electrical energy supplied to the electromagnet.

When a braking operation is initiated by the energization of the electromagnet and the movement of the lever arms 98 and 100 and subsequent rotation of the actuating disc 62 as described above, it is to be noted that the actuating disc 62 becomes frictionally but slippingly coupled with the adjacent rotor disc. In other words the adjacent rotor disc tends to drive or rotate the actuating disc 62 in the same direction as the actuating disc is urged by the levers so as to provide a force in addition to the force of the levers tending to rotate the actuating disc and promote a braking action. Thus, the tendency of the rotor to drive the actuating disc 62 provides the brake unit with a self-energizing action.

Upon the completion of a braking operation, the electromagnet is deenergized and the actuating disc is urged toward its retracted position by the springs 74 which provide a force sufficient to overcome the self energizing force of the unit. It will be appreciated that after repeated braking operations, the friction surfaces on the rotor and stator discs as well as on the actuating disc and housing will gradually wear away so that the running clearances between the surfaces when the brake is deenergized will tend to increase. In order to maintain such clearances nearly constant, means is provided for adjusting the location of the retracted position of the actuating disc. In other words, means is provided for adjustably limiting return movement of the actuating disc.

As shown in FIGS. 3 and 4, the adjusting means for compensating for wear comprises a threaded member or screw 118 extending through an internally threaded radially projecting boss 120 on the actuating disc 62. The screw has an enlarged head 120 at one end thereof engageable with an abutment surface 122 on an adjacent boss 70. An opposite end 124 of the screw is engageable with an abutment surface 126 on the housing member 24 when the actuating disc is moved toward the right as viewed in FIG. 4 during a braking operation. The complementary threads of the screw 118 and the internally threaded boss 20 are such that upon engagement of the screw against the abutment surface 126 during a braking operation and after the friction surfaces have been worn away a predetermined amount, the axial pressure on the screw will cause the screw to be rotated and moved axially relative to the actuating disc 62 toward the left as viewed in FIG. 4. In other words, this movement of the screw adjusts the abutment end 120 toward the abutment surface 122 for limiting return movement of the actuating disc 62 toward the left as viewed in FIG. 4 upon the completion of a braking operation. The abutment enlargement or head 120 of the screw is provided with peripheral ratchet teeth 128 cooperable with a spring pawl 130 shown in FIG. 3 for preventing reverse rotation of the screw.

Figure 7:
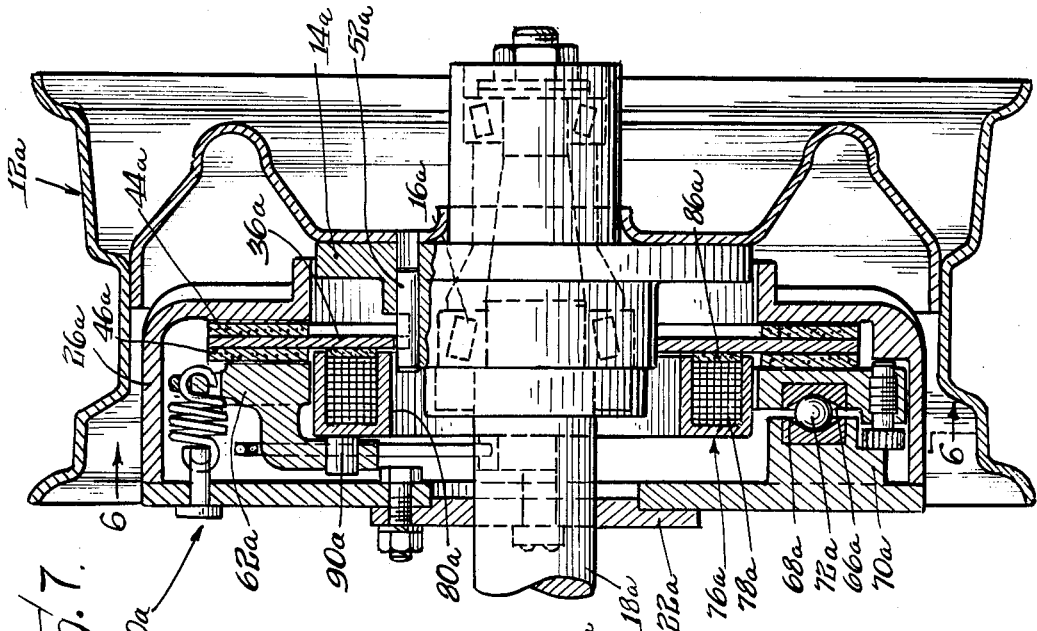
FIG. 7 is a partial sectional view taken generally along line 7—7 in FIG. 6.
Figure 6:
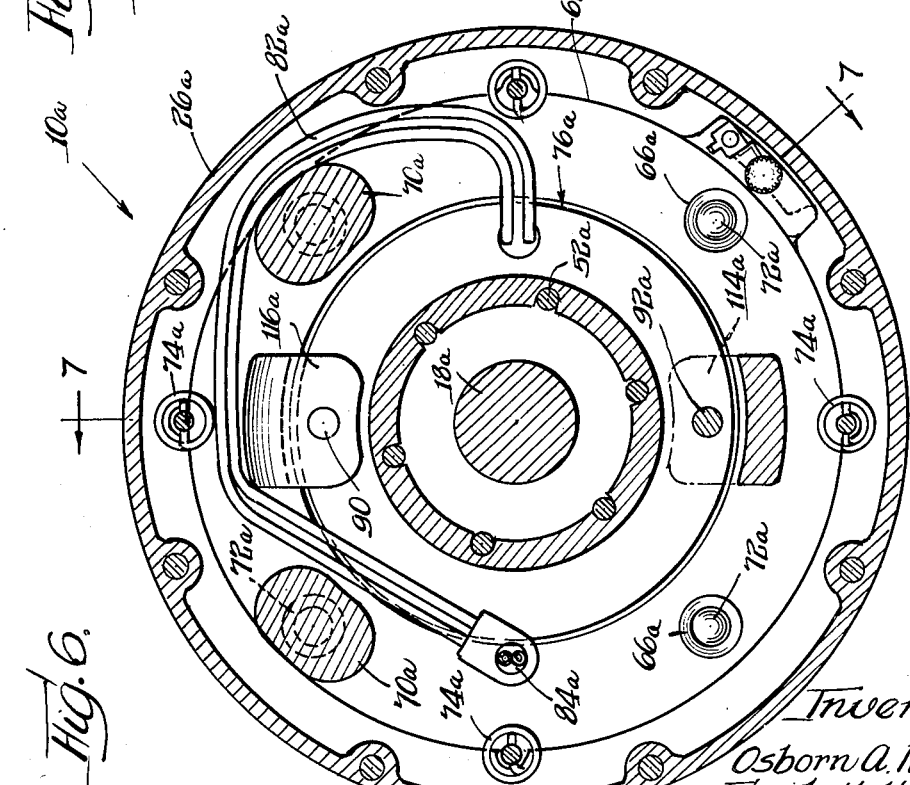
FIG. 6 shows a modified form of the present invention and is a sectional view taken generally along line 6—6 in FIG. 7.

In FIGS. 6 and 7 there is shown a modified form of the present invention which is similar to the structure described above as indicated by the application of identical reference numerals with the suffix *a* added to corresponding parts. This embodiment differs in that a single rotor disc 36a is used rather than multiple rotor and stator discs, and the electromagnetic means is coupled directly to the actuating disc 62a rather than through a force multiplying lever system. In connection with the last mentioned change, it is noted that the pins 90a and 92a projecting from the magnet shell extend through apertures in lugs 116a and 114a which extend radially inwardly from the actuating disc rather than radially outwardly. While this structure may provide a less effective braking action for a given amount of electrical energy input as compared with the structure described above, the braking action is sufficient for many installations and this embodiment has the advantage of being a simplified self-energizing electromagnetically operated brake unit.

In the embodiment shown in FIGS. 6 and 7 the annular plate member 88 of the previously described embodiment is omitted. However, the thickness of the disc 36a is increased to at least equal the wall thickness of the magnet shell 80a for providing an effective path for the magnetic lines of flux as described above. Furthermore, a plate corresponding to the previously described plate 88 could be included if desired. It may also be observed that for certain installations it may be found desirable to utilize the multiple rotor disc assembly in brake units such as that shown in FIGS. 6 and 7 wherein the electromagnet is directly coupled with the actuating disc 62a and in other installations it may be found desirable to utilize only single rotor discs in brake units of the type shown in FIGS. 1 through 5 wherein the magnetic means is coupled with the actuating disc through a linkage or lever mechanism.

While preferred embodiments of the present invention have been shown and described herein, it is obvious that many structural details may be changed without departing from the spirit and scope of the appended claims.

The invention is claimed as follows:

1. A friction unit comprising first and second relatively rotatable and relatively axially shiftable and engageable means, one of said means comprising a magnetic rotatable member, third means adjacent said first and second means and shiftable relative to and for relatively urging said first and second means into engagement with each other, and rotative means operably connected with said third means and releasably magnetically and slippingly coupleable with said rotatable member for shifting said third means and energizing said unit when coupled with said rotatable member, said rotative means comprising an electromagnet.

2. A friction unit, as defined in claim 1, wherein said electromagnet includes a pad of friction material engageable with said magnetic member when the electromagnet is energized.

3. A friction unit, as defined in claim 1, wherein said electromagnet comprises an annular coil, and an annular shell surrounding said coil and having a generally U-shaped cross section and a predetermined wall thickness, said rotatable member having a thickness at least substantially as great as said wall thickness.

4. A friction unit, as defined in claim 1, which includes a lever mounted on a pivot adjacent said third means and said rotative means, said lever having a connection with said third means spaced a predetermined distance from said pivot, and said lever having a connection with said rotative means spaced a distance greater than said predetermined distance from said pivot.

5. A friction unit, as defined in claim 1, which includes means connecting said third means with said rotative means for movement in unison with said rotative means.

6. A brake unit comprising means providing a fixed friction surface, rotor disc means connectable with a member to be controlled rotatable around a predetermined axis and disposed adjacent to and axially engageable with said friction surface, an actuating disc concentric with said rotor disc means and engageable therewith opposite from said friction surface, fixed backup means adjacent said actuating disc, means between said actuating disc and said backup means for axially shifting the actuating disc against said rotor disc means upon rotative movement of the actuating disc relative to the backup means, and rotative electromagnet means releasably magnetic and slippingly coupleable with said rotor disc means and connected with said actuating disc for rotatively shifting the actuating disc and energizing the brake unit.

7. A brake unit, as defined in claim 5 wherein said electromagnet comprises an annular coil concentric with said rotor disc means and an annular shell surrounding said coil and having a generally U-shaped transverse cross section and a predetermined wall thickness, opposite ends of the generally U-shaped cross section of the wall being substantially adjacent to said rotor means, said rotor means having a thickness in the vicinity of said electromagnet at least substantially as great as said wall thickness.

8. A brake unit, as defined in claim 7, wherein said electromagnet comprises an annular pad of friction material overlying said coil and frictionally engageable with said rotor disc means when the electromagnet is energized.

9. A brake unit, as defined in claim 6 which includes a lever extending between said actuating disc and said electromagnet, pivot means pivotally supporting said lever, means interconnecting said lever and said actuating disc and spaced a predetermined distance from said pivot means, and means spaced a greater distance from said pivot means and interconnecting said lever and said electromagnet.

10. A brake unit, as defined in claim 6, wherein said backup means and said actuating disc including opposing cam surfaces and said means between said backup means and said actuating disc comprising anti-friction elements engageable with the opposing cam surfaces, at least certain of said cam surfaces being inclined with respect to said actuating disc.

11. A brake unit, as defined in claim 10, which includes automatically adjustable and one-way shiftable means extending between said actuating disc and said backup means for limiting return movement of the actuating disc and thereby compensating for wear.

References Cited by the Examiner

UNITED STATES PATENTS 2,061,787 11/1936 Warner _____ 192—84
2,623,619 12/1952 Clerk _____ 192—35

DUANE A. REGER, *Primary Examiner.*